United States Patent [19]

Sandusky

[11] Patent Number: 4,485,337
[45] Date of Patent: Nov. 27, 1984

[54] SERVO DATA DRIVEN MOTOR SPEED CONTROL

[75] Inventor: Randall L. Sandusky, Tuttle, Okla.

[73] Assignee: Control Data Corporation, Bloomington, Minn.

[21] Appl. No.: 492,847

[22] Filed: May 9, 1983

[51] Int. Cl.³ ............................................. G05B 5/00
[52] U.S. Cl. ................................... 318/314; 318/326; 318/329; 318/341
[58] Field of Search ................... 179/100.1 G; 360/73; 318/301, 310, 314, 341, 326, 329, 398, 463, 464, 618

[56] References Cited

U.S. PATENT DOCUMENTS

| | | |
|---|---|---|
| 3,176,208 | 3/1965 | Gifft ...................................... 318/314 |
| 3,950,682 | 4/1976 | Dohanich ............................ 318/314 |
| 4,236,050 | 11/1980 | Winslow et al. ............. 179/100.1 G |
| 4,338,683 | 7/1982 | Furukawa et al. ................ 360/73 X |

Primary Examiner—Ulysses Weldon
Attorney, Agent, or Firm—Edward P. Heller, III; Joseph A. Genovese

[57] ABSTRACT

A digital motor speed control for a disk drive which is speed regulated by servo data retrieved from the disk drive's servo disk.

8 Claims, 7 Drawing Figures

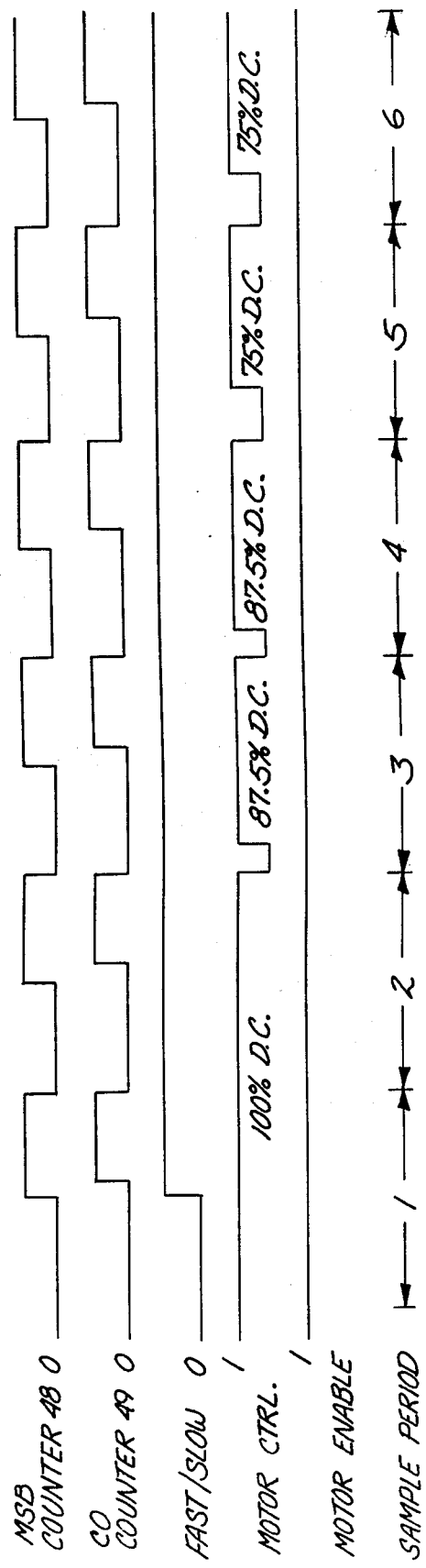
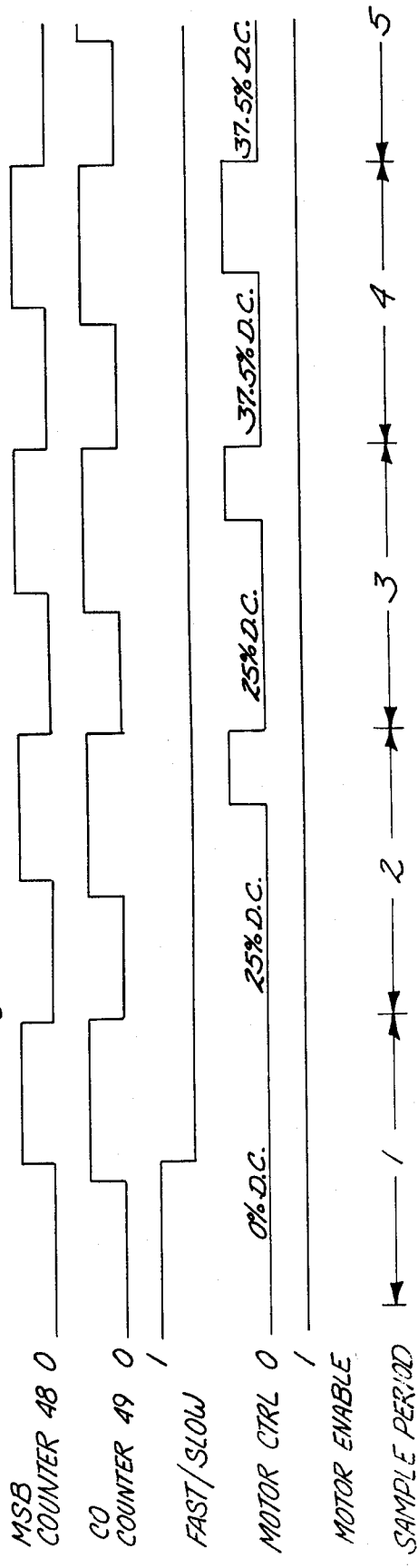

SERVO DATA DRIVEN MOTOR SPEED CONTROL

BACKGROUND OF THE INVENTION

1. Field of the Invention

This invention relates generally to the field of disk drives, and more particularly, to their digital motor speed control circuits.

2. Brief Description of the Prior Art

It is common practice to use a brushless D.C. motor to drive a disk drive spindle. The speed of rotation of the spindle must be maintained at a constant r.p.m., which is typically 3600 r.p.m. The speed regulation apparatus conventionally includes a sensor coupled to the motor shaft which outputs a pulse periodically on rotation of the shaft. The frequency of output of this pulse is then compared to the frequency of a reference. Based on the comparison, the speed control circuit either increases the speed of rotation or decreases it.

A typical speed control system, according to the above, is shown in Dohanich, Jr. U.S. Pat. No. 3,950,682 (filed Dec. 19, 1974) assigned to International Business Machines Corporation, Armonk, N.Y.

SUMMARY OF THE INVENTION

The present invention eliminates the need for input to the speed regulation system from a separate sensor mechanism coupled to the motor shaft. In its place, it uses the servo data present on all disk drives to provide an indication of rotational velocity. The servo data is conventionally used to position and align the head accurately at the center of a data track on the disk.

The present invention recovers the sync pulses present in each frame of servo data with the circuitry ordinarily associated with the disk drive's servo system and couples the recovered sync pulses into the speed control circuit.

The speed control circuit compares the frequency of the recovered sync pulses with the frequency of a reference oscillator. The result of the comparison is used to adjust the selection of a predetermined number of duty cycles of power application to the motor. The period of the duty cycle is determined by the frequency of the sync pulses.

The operating mode of the invention will allow the motor to achieve a fixed speed independent of loading or load changes. No initial adjustments need be made as are required in analog systems due to component tolerances, for the present invention is self-compensating. In addition, the implementation of the speed control circuit in digital logic makes it usable in large scale integrated technologies.

BRIEF DESCRIPTION OF THE DRAWINGS

FIG. 4a, 4b and 4c are timing diagrams showing performance of the speed regulation circuit for a motor too fast condition, a motor too slow condition, and a possible nominal operating sequence.

DESCRIPTION OF THE PREFERRED EMBODIMENT

Figure 1:
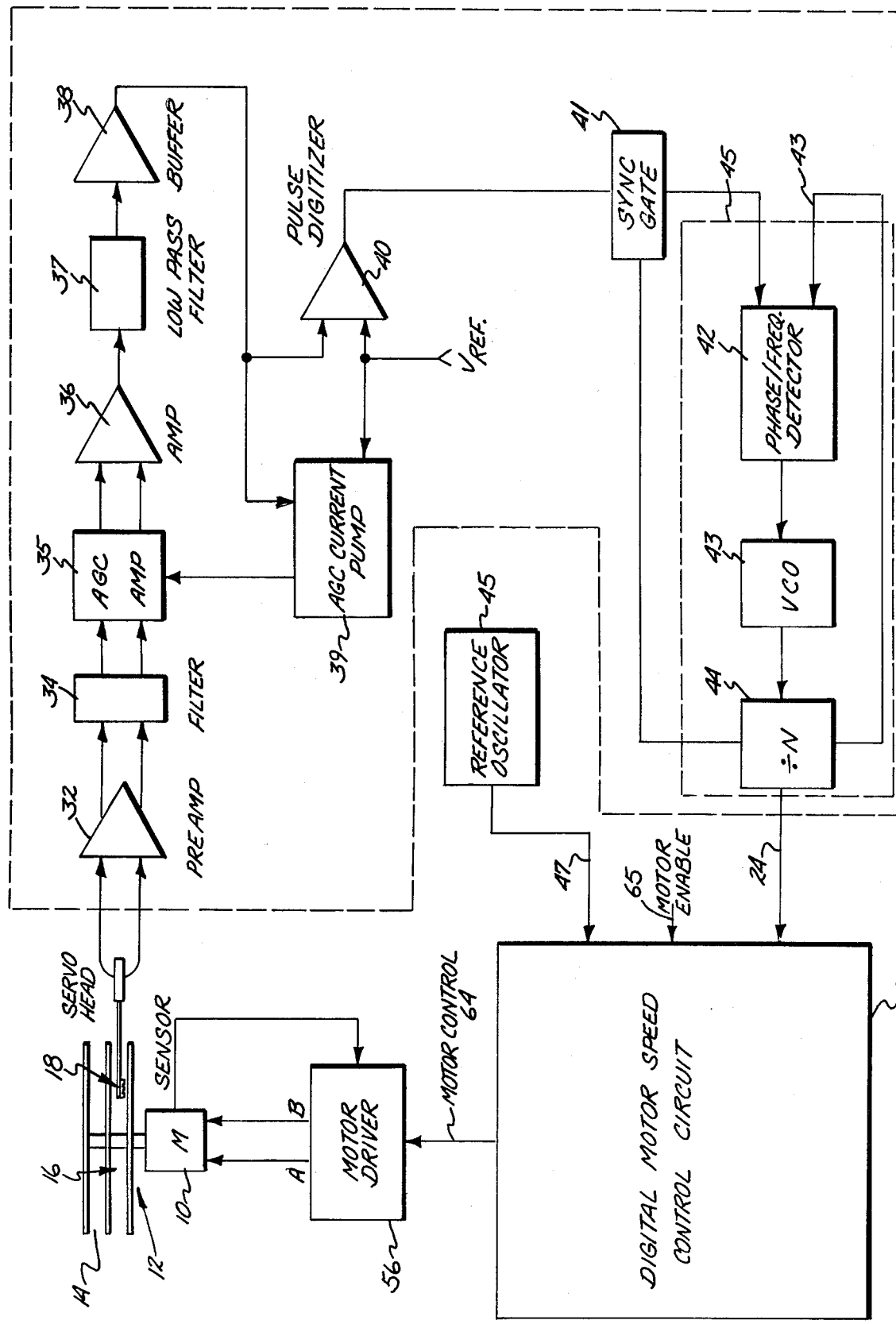
FIG. 1 is a system block diagram of the present invention.

FIG. 1 shows a system block diagram of the present invention. Spindle motor 10, which is conventionally a brushless DC motor, drives spindle and disk combination 12 having multiple disks 14. As is common when multiple disks are employed, at least one disk surface is dedicated to serve a servo function. Such a servo surface 16 is completely written with servo data. Servo head 18 reads this servo data and transmits it to servo data recovery circuit 20. Commonly this servo data recovery circuit 20 provides the servo data to a circuit (not shown) which uses the data to generate an error signal showing a positional offset of the servo head from a data track center. The error signal is provided to a servo system (not shown) which positions the head at a data track center.

Figure 2A:
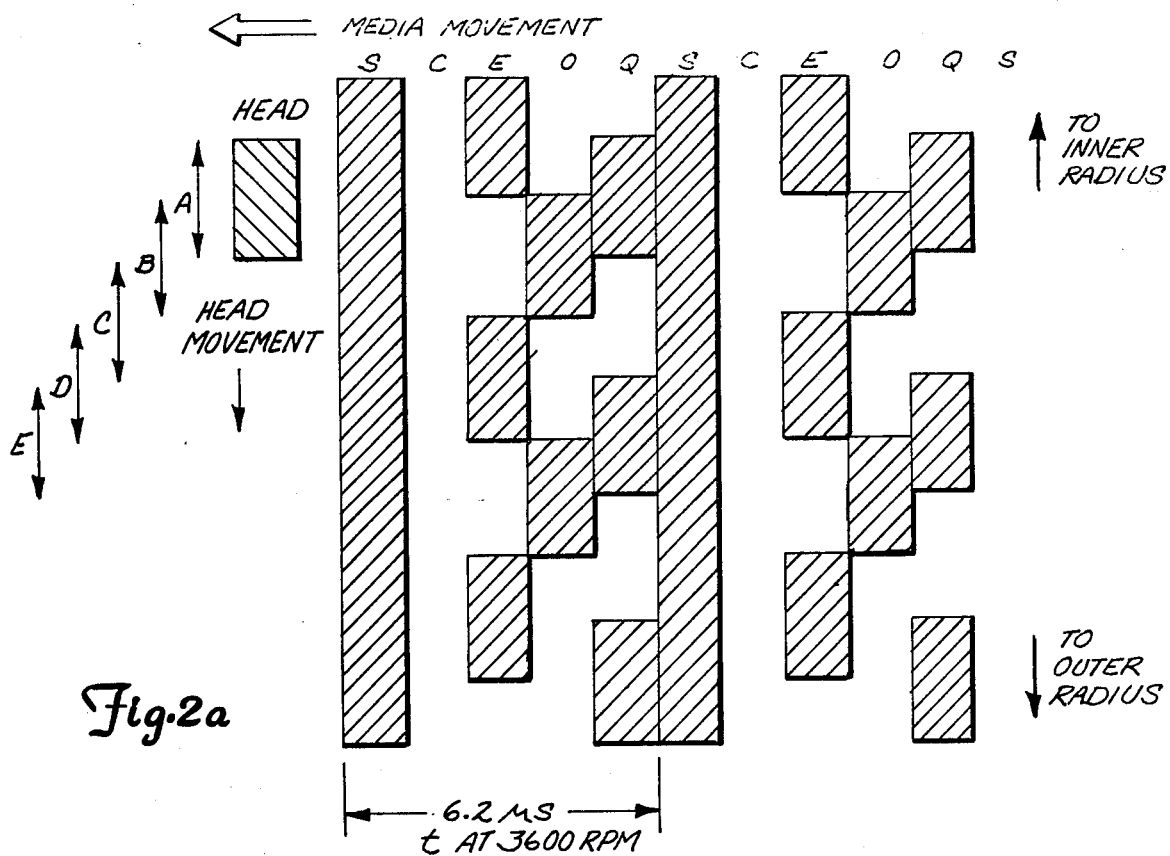
FIGS. 2a and 2b are diagrams of servo data patterns of two frames of servo data and the signals they induce in a servo head.
Figure 2B:
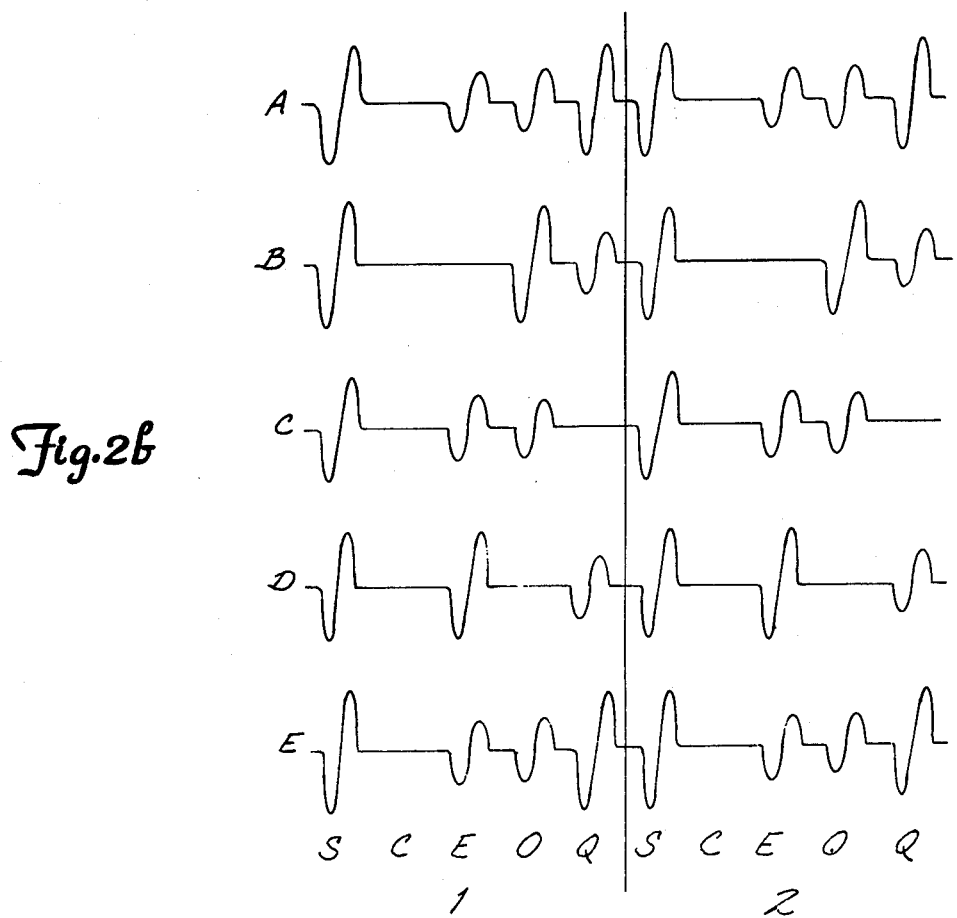

FIG. 2 shows two "frames" of servo data spanning four typical tracks. The shaded areas represent dibit transitions. In consecutive order, a servo head 18 will encounter in a frame a "sync" dibit ("s"), a "code" dibit ("c"), an "even" dibit ("e"), an "odd" dibit ("o") and a "quad" dibit "q". The function of the latter three dibits is to indicate to the error detection circuitry the location and velocity of the head 64, as can be seen in reference to arrows "A", "B", "C", and "D" and "E" and the pattern induced in the head circuits thereby as indicated by corresponding signal patterns A–E of FIG. 2b. The first of the dibits in a frame ("s") is a "sync" pulse, which is written at constant amplitude along a disk radius. The code "c" pulse is used to provide track indexing information.

There are 2688 frames of such servo data per track of servo data in the preferred embodiment. At a nominal r.p.m. of 3600, one sync pulse occurs every 6.2 microseconds or 161,280 per second.

In the preferred embodiment, the servo data recovery circuit 20 also provides a feedback signal 24 into a digital motor speed control circuit 26. This latter circuit 26 compares the feedback signal 24 with a signal 47 from a reference oscillator 28. The result of the comparison provides an indication of whether the motor is spinning too fast or too slow. The results of the comparison are used to control a motor driver circuit 56, which provides power to the brushless DC motor 10.

In the servo data recovery circuit 20, the differential servo data signal detected by servo head 18 is coupled into a preamp 32 which is then filtered by low pass filter 34 and conditioned by an automatic gain control circuit composed of amplifiers 35 and 36, low pass filter 37, buffer amplifier 38, and automatic gain control current pump 39, which provides feedback to amplifier 35, as is known in the art. The output of buffer amplifier 38 also is input into pulse digitizer or comparator 40. The other input to pulse digitizer or comparator 40 is a reference voltage $V_{ref}$. Signals exceeding $V_{ref}$ will trigger the comparator to a specific state. Signals below that voltage will not trigger the comparator.

The output at digitizer 40 is then coupled to a sync gate 41, the purpose of which is to isolate the sync pulses from the other pulses in the frame. Sync gate 41 is controlled by phase-locked loop 45, which is comprised of a phase and frequency detector 42, voltage controlled oscillator 43, a divide by N counter 44, and feedback 43. The output of the phase lock loop 45 is normally provided to the error detection circuit and other drive circuits. Here it is also provided as a "feedback" input 24 to the digital motor speed control circuit 26.

The circuits of the servo data recovery circuit 20 of FIG. 1 are conventional and form no part of the present invention.

As additional input to motor speed control circuit 26 is Motor Enable 65, which essentially turns the motor power on and off. See infra.

Figure 3:
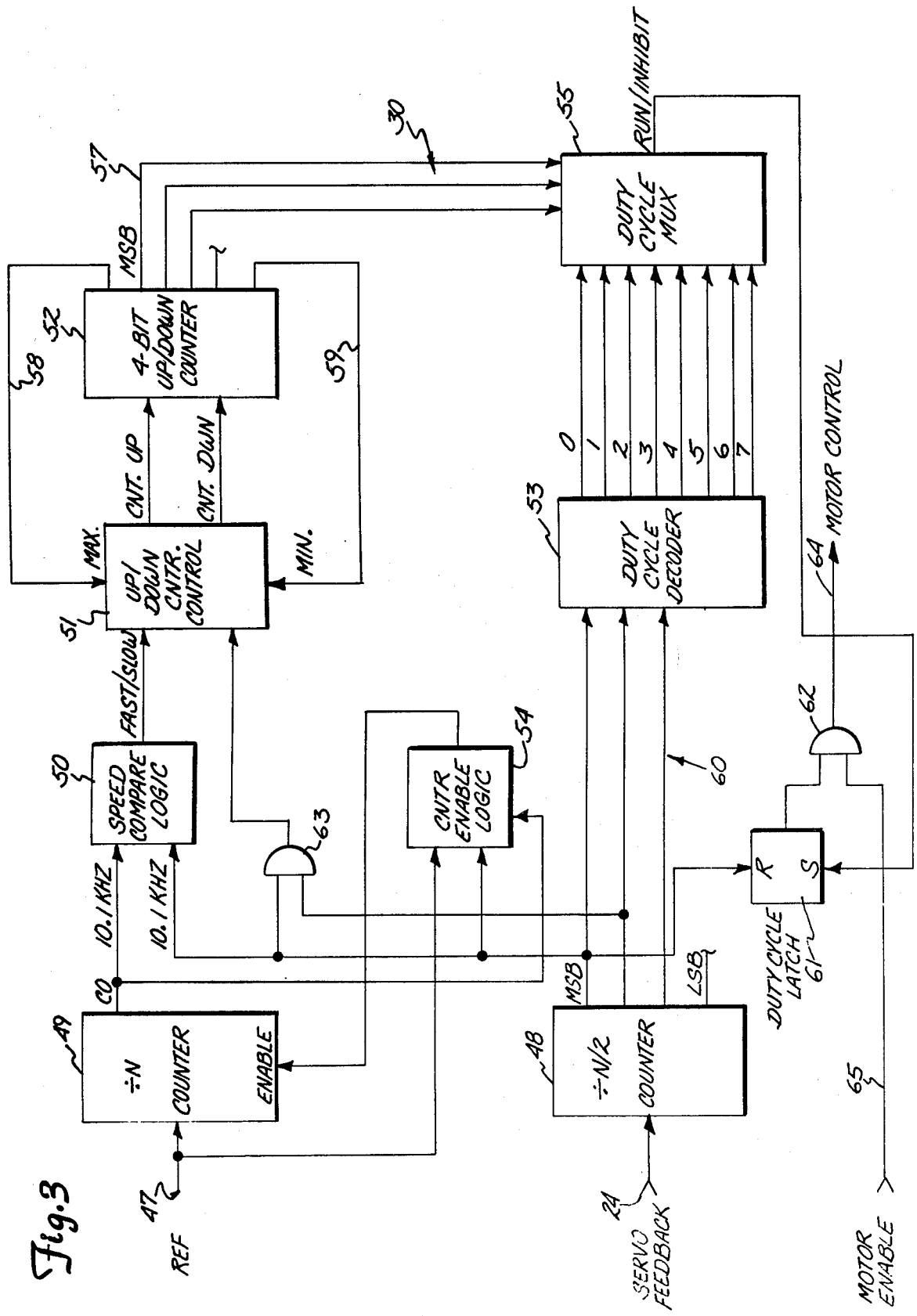
FIG. 3 is a block diagram of the speed control electronics.

In FIG. 3, the reference oscillator signal 47 is provided as an input to divide by N counter 49, the carry out ("CO") of which is provided as an input to speed compare logic 50. The servo feedback signal 24 from divide by N counter 44 is provided as an input to divide by N/2 counter 48. The most significant bit ("MSB") of this counter is provided as a second input to speed compare logic 50. The frequencies of these two inputs are approximately 10.1 kilohertz each in the preferred embodiment when the spindle motor 10 is operating at nominal rotational velocity. The frequency of the most significant bit of counter 48 is also the frequency of the sample period of circuit 26. As long as the ratio of counter 49 to counter 48 is maintained at 2 to 1, the sample period of the circuit 26 can be changed by the designer to provide the best operation for his particular application.

To assure that the counters are synchronized at the beginning of a sampling period, the reference oscillator 47 is also provided to a counter-enable logic circuit 54, which has a second input the most significant bit of the servo feedback counter 48. Counter-enable logic 54 enables reference counter 49 to count on the first cycle of reference oscillator signal 47 after the MSB of feedback counter 48 is removed. A CO from counter 49 resets counter-enable logic 54 and inhibits counting in counter 49.

The speed compare logic 50 uses conventional circuitry to determine whether the two frequencies input to it from counters 48 and 49 are above or below each other. The result of this comparison is provided as a fast or slow signal to up and down counter control 51. If the motor is too fast, counter 49 will reach its maximum count during the presence of the MSB of counter 48. If the motor is too slow, counter 49 will reach its maximum count before the presence of the MSB of counter 48.

The presence of both the MSB and next MSB of counter 48 enables gate 63, the output of which clocks up/down control 51 at the fall of the output, which occurs at the fall of the MSB.

The clocking of up/down control 51 also clocks up/down counter 52 to count up or to count down depending on the state of the fast/slow indication of speed compare logic 50. On maximum count, up/down counter outputs a signal 58 to inhibit up/down control 51 from sending further count up clocks. Similarly when the counter 52 reaches its minimum count, the counter 52 outputs a signal 59 to inhibit up/down control 51 from sending further count down clocks. On every receipt of a count up clock, the counter 52 will increment. On every receipt of a count down pulse the counter 52 will decrement. Due to the feedbacks 58 and 59, when the counter reaches a count of 0 or a count of 15, the counter holds at that count.

In operation, when the motor is too fast at the receipt of a clock, the counter 52 will count up 1, until it reaches maximum count and there holds. When the motor is too slow, the counter 52 will count down one, until minimum count is reached and there holds.

The three most significant bits 30 of the 4-bit counter 52 are provided as one set of inputs to duty cycle multiplexer 55. Depending on the state of these bits 30, one of eight duty cycle decodes is multiplexed to the Duty Cycle Latch 61. The eight decodes are illustrated in the figure as outputs 0 through 7 of duty cycle decoder 53. These decodes are used by the Duty Cycle Latch 61 to generate eight duty cycle outputs which represent a different percentage of "power-on" time between receipt of a most significant bit of the servo feedback counter 48. Duty cycle output "0" has applied 100% power to the motor 10. Output "1" applies an 87.5% duty cycle. And so on in decrements of 12.5% to output "6," which has a duty cycle of 25%. Duty cycle output "7" has a 0% duty cycle.

The count on the three most significant bits 30 from 4-bit counter 52 corresponds to the number of the output selected. Thus, if the state of the three most significant bits 30 is 0, output "0" is selected, and 100% power is applied to the motor between receipt of two most significant bits from the servo feedback counter 48. Similarly if the state of the bits is 6, output "6" will be selected and power is applied during 25% of the time between receipt two of the most significant bits of the servo feedback counter 48.

The duty cycle decoder determines the amount of time the motor is turned "off"; i.e., from the start of the sample period (at the fall of MSB) until latch 61 is set. Outputs "0" through "7" derived from bits 60 of counter 48 specify different percentages of the duty cycle "off" time. The specific cycling of on time and off time on each of the outputs "0" through "7" of the duty cycle decoder is controlled by the three most significant bits 60 of the servo feedback counter 48 and by duty cycle latch 61. At the fall of MSB from counter 48, the latch is logically reset and the motor control signal 64 to motor driver 56 disables power to motor 10. At the logical rise of a run signal from duty cycle multiplexer 55, the latch 61 is logically set, sending a motor control signal 64 to motor driver 56 to enable power to motor 10.

Referring to FIGS. 4a and 4b, there are illustrated two timing diagrams, one occurring when the motor is too slow and the other occurring when the motor is too fast. Turning our attention first to the condition when the motor is too slow, the second line of FIG. 4b refers to the carry ("CO") output of the reference oscillator divide by N counter 49. The line just above represents the most significant bit ("MSB") of the servo feedback counter 48. Comparison of these two lines shows that the servo feedback frequency is less than that of the reference frequency. Thus we have a motor too slow condition.

When the motor is too slow, more power must be applied to the motor. If we assume that the initial count in the counter is a count of 15, duty cycle "7," having a duty cycle of 0%, is then multiplexed to the motor driver 56. At receipt of the next most significant bit from the servo feedback counter 48 the 4-bit, counter 52 decrements by 1 to a count of 14. The state of the three most significant bits remains unchanged and duty cycle 7 remains selected. At the receipt of the next most significant bit, the counter 52 decrements to 13 and duty cycle "6," having a 25% duty cycle, is multiplexed to the motor driver 56. This sequence continues until the motor too fast condition is reached or a count of zero is reached. At the receipt of every most significant bit, counter 52 decrements. At every other most significant bit, the selection of duty cycles changes.

Assuming that the motor is too fast and that the 4-bit counter 52 has a count of 0, duty cycle "0," having duty cycle of 100% is multiplexed to the motor driver 56, as seen in FIG. 4a. At the next receipt of a most significant bit from the servo feedback counter 48, counter 52 increments to a count of 1. At the receipt of the next most significant bit, the counter increments to a count of 2 and duty cycle "1", having a 87.5% duty cycle is multiplexed to the motor driver 56. At the receipt of the next most significant bit, counter 52 increments to a count of 3. At a next most significant bit, the counter will increment to 4 and duty cycle "2" having a duty cycle of 75% is multiplexed to the motor driver 56. This sequence will continue until a motor too slow condition is reached or a count of 15 is reached.

Figure 4C:
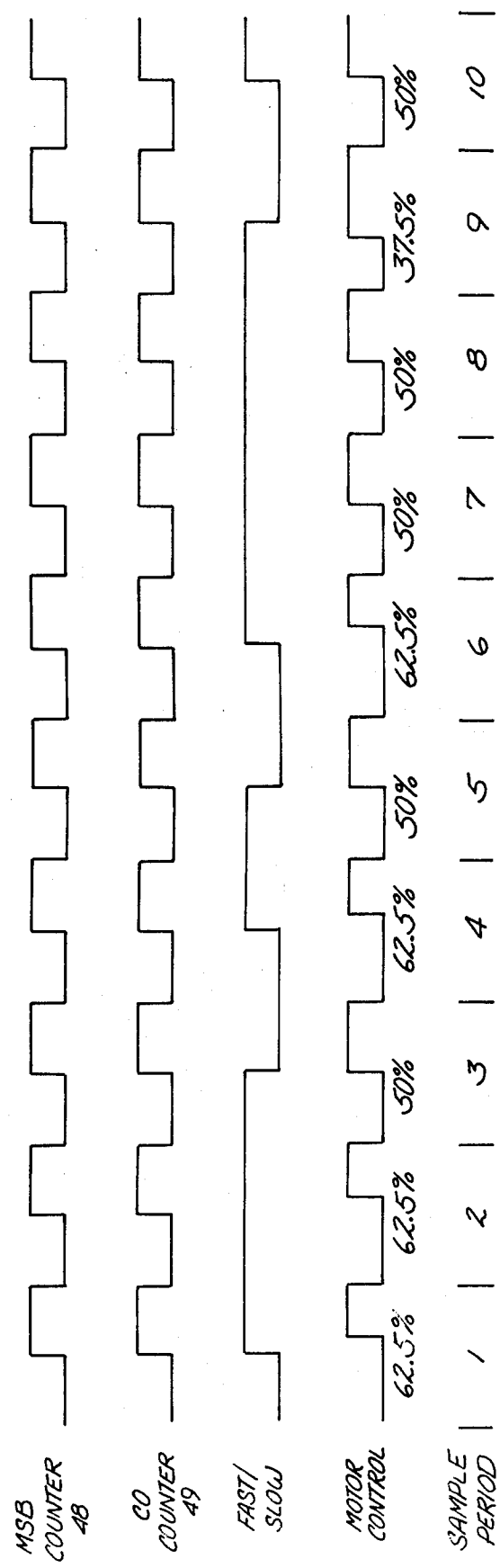

Under actual operating conditions the motor speed control circuit 26 will "hunt" a duty cycle—or narrow range of duty cycles—which will keep the motor at the required speed. The average duty cycle applied to the motor windings depends on the torque constant of the motor as well as its inertial load. FIG. 4c displays a possible sequence of operation for the motor speed control circuit under actual operating conditions.

Accurate control of the motor speed is provided because the duty cycle of the power applied to the motor varies rapidly in response to changes in motor speed.

The specification of the elements of the preferred embodiment are not to be taken as a limitation on the scope of the appended claims, in which I claim:

1. A motor speed control comprising:
   a motor;
   means for generating feedback signals responsive to the speed of rotation of said motor;
   a reference speed indicating means;
   an up/down counter means;
   feedback signal counter means for counting said feedback signals and for resetting to a count of zero on reaching a first predetermined count;
   means responsive to said feedback signal counter means and to said reference speed indicating means for incrementing or decrementing said up/down counter depending on whether the speed of rotation of said motor is too fast or two slow;
   decode means responsive to said feedback signal counter means for outputting a predetermined number of decode signals, each signal indicative of the count in said feedback signal counter means reaching a predetermined one of a corresponding number of counts;
   multiplexer means responsive to the count of said up/down counter for selecting one of said predetermined decode signals; and
   duty cycle latch means responsive to the logical rise of the selected signal for enabling power application to said motor and further responsive to a predetermined count of said feedback signal counter means for disabling power application to said motor.

2. The speed control of claim 1 wherein said means for generating feedback signals comprises means for recovering servo data from a disk.

3. The speed control of claim 1 wherein said reference speed indicating means comprises a reference oscillator means.

4. The speed control of claim 2 wherein said servo data includes sync dibits and said feedback signals are output upon detection of said sync dibits.

5. The speed control of claim 3 wherein said means responsive to said feedback signal counter means includes means for comparing the frequency of said feedback signals to the frequency of said reference oscillator.

6. The speed control of claim 5 wherein said means responsive to said feedback signal counter means includes means for incrementing or decrementing said up/down counter means responsive to said means for comparing.

7. The speed control of claim 6 wherein said up/down counter means includes means for holding on reaching maximum or minimum count.

8. The speed control of claim 4 wherein said feedback signal counter means includes means for generating a most significant bit signal on counting a predetermined number of said feedback signals; said means for incrementing or decrementing said up/down counter means being responsive to said most significant bit signal.

* * * * *

UNITED STATES PATENT AND TRADEMARK OFFICE
CERTIFICATE OF CORRECTION

PATENT NO. : 4,485,337
DATED : Nov. 27, 1984
INVENTOR(S) : Sandusky

It is certified that error appears in the above—identified patent and that said Letters Patent is hereby corrected as shown below:

On the title page:
The name of assignee is changed from "Control Data Corporation: to "Magnetic Peripherals Inc."

Signed and Sealed this

Seventh Day of May 1985

[SEAL]

Attest:

DONALD J. QUIGG

Attesting Officer     Acting Commissioner of Patents and Trademarks